United States Patent [19]
Saito et al.

[11] 4,107,708
[45] Aug. 15, 1978

[54] SHUTTER CONTROL CIRCUIT HAVING EXPOSURE TIME DISPLAY

[75] Inventors: Takeo Saito; Youichi Seki, both of Chiba, Japan

[73] Assignee: Seiko Koki Kabushiki Kaisha, Japan

[21] Appl. No.: 698,062

[22] Filed: Jun. 21, 1976

Related U.S. Application Data

[63] Continuation of Ser. No. 499,976, Aug. 23, 1974, abandoned.

[30] Foreign Application Priority Data

Aug. 24, 1973 [JP] Japan .................................. 48-95004

[51] Int. Cl.² .............................................. G03B 7/00
[52] U.S. Cl. ............................... 354/60 L; 354/23 D; 354/53
[58] Field of Search ............. 354/23 D, 50, 51, 60 L, 354/60 A, 53; 340/377, 324, 339

[56] References Cited

U.S. PATENT DOCUMENTS

| | | | |
|---|---|---|---|
| 3,843,249 | 10/1974 | Kitaura .............................. | 354/23 D |
| 3,872,483 | 3/1975 | Numata et al. ................... | 354/23 D |
| 3,876,876 | 4/1975 | Kitai et al. ........................ | 354/23 D |
| 3,955,185 | 5/1976 | Nishimura ........................ | 340/377 |

*Primary Examiner*—Russell E. Adams
*Attorney, Agent, or Firm*—Robert E. Burns; Emmanuel J. Lobato; Bruce L. Adams

[57] ABSTRACT

An electric shutter circuit having an exposure time display disabled in synchronism with the opening of a camera shutter. A brightness-time conversion circuit and a pulse generator together develops a plurality of pulses the number of which is representative of the exposure time and which are stored in a reversible counter. Upon actuation of a shutter release mechanism a display circuit is enabled to display the exposure time by displaying a visual signal determined by the number of pulses stored in the reversible counter. The display circuit is disabled in synchronism with the shutter opening. In one embodiment a Schmidt trigger circuit is triggered by the shutter release mechanism to disable the display circuit.

2 Claims, 3 Drawing Figures

This is a continuation, of application Ser. No. 499,976, filed Aug. 23, 1974, now abandoned.

SHUTTER CONTROL CIRCUIT HAVING EXPOSURE TIME DISPLAY

BACKGROUND OF THE INVENTION

The present invention relates to an electric shutter control circuit for a camera using a digital memory regeneration system provided with a display circuit. During production of a single pulse having a pulse width inversely proportional to the brightness of a photographed body, standard pulses are stored in a counting circuit, and an exposure time corresponds to a memory value stored in the counting circuit. The memory value that has been stored in the counting circuit is called out simultaneously with the opening of the shutter blade, to control the exposure time.

Electric shutter control circuits having a digital memory regeneration system provided with a display circuit have already been proposed, but since in all of these types the display circuit leaves a display lamp energized even when the shutter is opened, a large electric current is needed particularly in lighting the display lamp, so that the battery for this purpose will be consumed severely. It is also conceivable that a mechanical switch be provided separately for de-energizing the display lamp following the blade opening, but there is a problem concerning the durability and reliability of the switch.

SUMMARY OF THE INVENTION

The object of this invention is to eliminate the defects mentioned above and to provide an electric shutter circuit for a camera having a counting circuit to count and store a number of pulse that varies corresponding to the brightness of a photographed body, to determine an exposure time controlled by the memory value stored in the said counting circuit. A display circuit includes display members that indicate the shutter speed, and a timing switch produces a trigger pulse for calling out the memory value stored in the said counting circuit. The display circuit is reset by a trigger pulse produced by the action of said timing switch synchronously with the start of shutter so that no display is made during exposure.

DESCRIPTION OF THE PREFERRED EMBODIMENT

Figure 1:
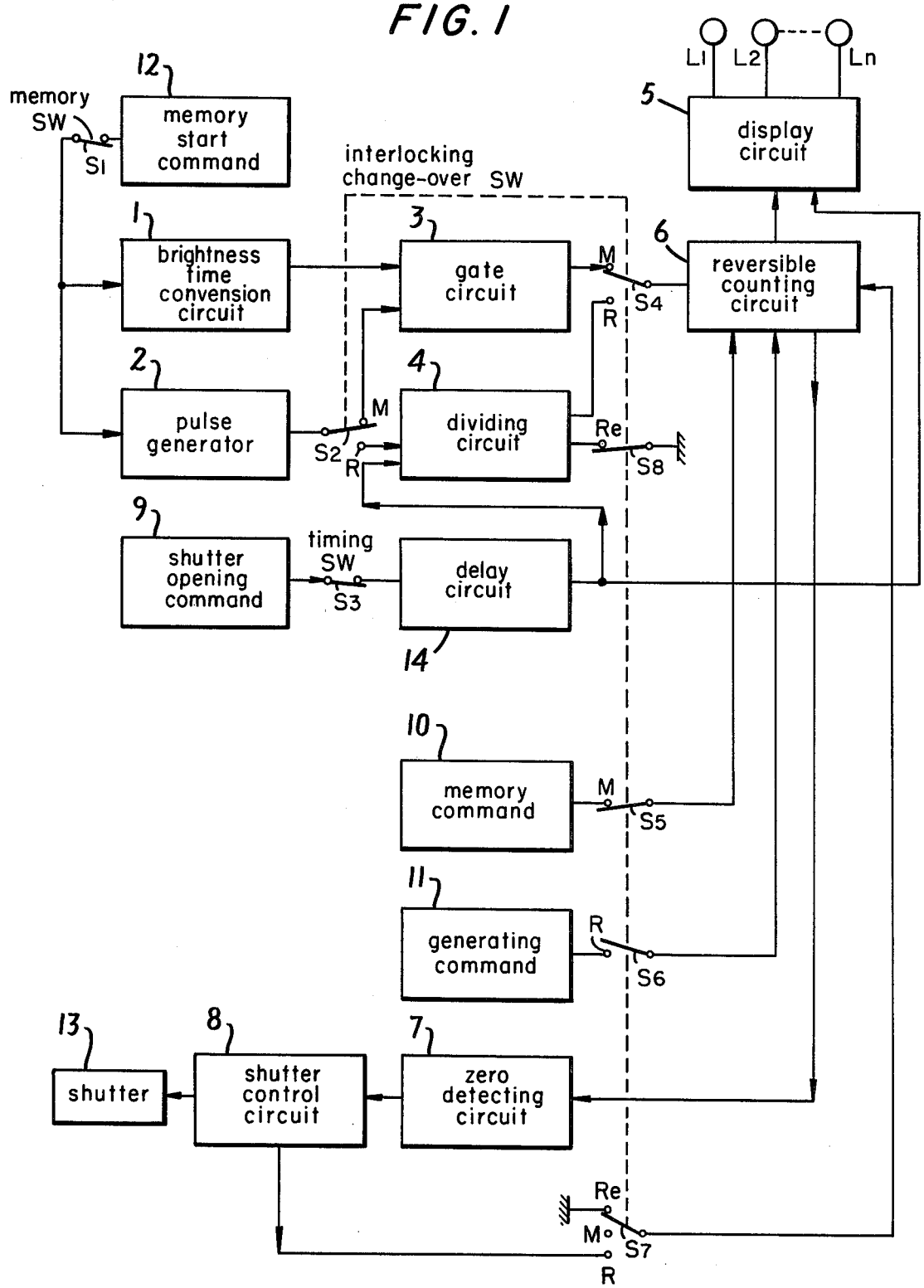
FIG. 1 is a block diagram of a shutter control circuit according to the present invention.

In the following the present invention will be described in detail referring to the drawings. FIG. 1 is a block diagram showing the structure of this invention, 1 is a brightness-time conversion circuit including a photo electric element for producing a single pulse having a pulse width inversely proportional to the brightness of a photographed body, 2 is a pulse generator to produce standard pulses of a certain definite frequency, 3 is a gate circuit whereby, during the single pulse produced in the brightness-time conversion circuit 1, the standard pulses produced in the pulse generator 2 can be sent to a reversible counting circuit 6. This reversible counting circuit 6 is comprised of a wellknown binary counting circuit consisting of a flip-flop circuit, and 5 is a display circuit for indicating the number of standard pulses counted by the reversible counting circuit 6. 7 is a zero detecting circuit for detecting a time when the memory contents of the reversible counting circuit 6 becomes zero, and 8 is a shutter control circuit. Interlocking changeover switches $S_2$, $S_4$, $S_5$, $S_6$, $S_7$, $S_8$ for memory and calling out are interlocked with the movement of the release button of a camera to enable changing-over of contact points Re, M, R.

Now, the action is described. When the release button of the camera is pushed down, each switch is at the position as indicated in the figure and the reversible counting circuit 6 and a frequency dividing circuit 4 are reset as the switches $S_7$, $S_8$ are grounded via the contact point Re. By pushing down the release button further, the switch $S_7$ is opened and the switch $S_8$ changes over to the position of contact point M, while the other switches remain at the indicated positions. When the memory switch $S_1$ is opened, a memory start command 12 is applied to the brightness-time conversion circuit 1 and the pulse generator 2, whereby the standard pulses of a definite frequency produced in the pulse generator 2 are sent to the reversible counting circuit 6 through the switch $S_2$, the gate circuit 3, and the switch $S_4$. Then the reversible counting circuit 6 sums up the pulse numbers successively in response to the memory command 10 applied through the switch $S_5$, and stores the sum.

In this case the number of pulses stored by the reversible counting circuit 6 is inversely proportional to the brightness of the photographed body, namely, if the brightness of the photographed body is high, the number of pulses stored in the reversible counting circuit 6 is few because the pulse width obtained in the brightness-time conversion circuit 1 is narrow. Reversely, if the brightness of the photographed body is low, the number of pulses stored in the reversible counting circuit 6 is many because the pulse width obtained in the brightness-time conversion circuit is wide. On the other hand, the memory value stored in the reversible counting circuit 6 causes, in the display circuit 5, one of the display elements $L_1$, $L_2$, — $L_n$ e.g., lamps or light thereby emitting diodes) to light, thereby indicating the shutter speed.

In case of a single lens reflex camera, the operation up to this point is performed before the release button is completely pushed down, the reflecting mirror for the view finder is raised, and the light incident on the photoelectric element is interrupted.

When the release button is pushed down further and the reflecting mirror for the view finder begins to go upward, the interlocking change-over switches for memory and calling-out $S_2$, $S_4$, $S_6$, $S_7$ are changed over to the position of contact point R and the switch $S_5$ is opened, and at the same time the shutter starts to open, and the timing switch $S_3$ is opened by a shutter blade opening member (not shown in the figure). The shutter opening command 9 is sent to a delay circuit 14, and after being delayed for a definite time in the delay circuit 14, the display circuit 5 is reset, and subjected to a trigger pulse. Then all of the display elements are extinguished, making the frequency-dividing circuit 4 start its operation.

The standard pulse train produced by the pulse generator 2 is frequency divided at the frequency-dividing circuit 4, and sent further to the reversible counting circuit 6 through the switch $S_4$. As the reversible counting circuit 6 has been given a regenerating command 11 by the switch $S_6$, the standard pulse train frequency divided by the frequency-dividing circuit 4 effects successive subtraction of the of the pulse from the memory values stored in the reversible counting circuit 6 successively, and when the memory value becomes zero, the zero detection circuit 7 detects this condition and, by controlling the shutter control circuit 8, interrupts the electric current of an electromagnet (not shown in the figure) that stops the shutter blade closing member (not shown in the figure) of the shutter 13. The interruption of the electromagnet current causes shutter to close by releasing the shutter blade closing member, and at the same time the signal for shutter closing obtained by the electromagnet is delivered to the reversible counting circuit 6 through the change-over switch $S_7$, thereby resetting the reversible counting circuit 6.

Figure 2:
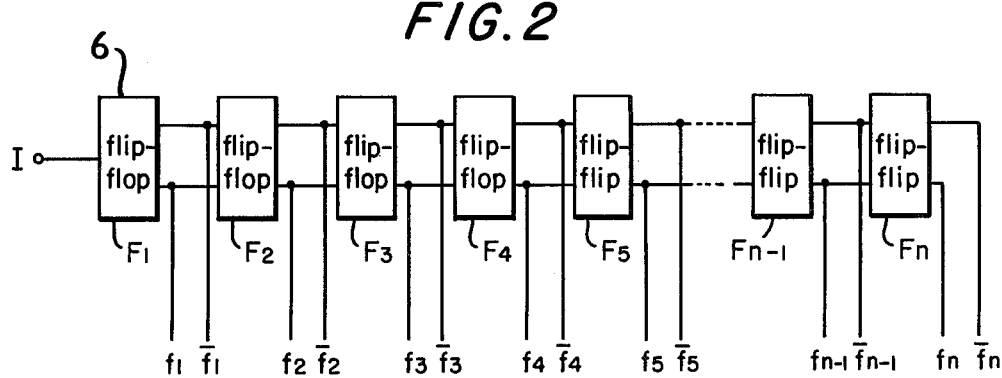
FIG. 2 is a schematic diagram of the reversible counting circuit shown in FIG. 1.

FIG. 2 shows the reversible counting circuit 6 explained in conjunction with FIG. 1. As shown in the figure, this is comprised of a wellknown binary reversible counting circuit consisting of a flip-flop circuit. To each of the flip-flop counting steps or stages $F_1$, $F_2$, $F_3$, $F_4$, $F_5$, — $F_{n-1}$, $F_n$ connected in cascade are connected output terminals $f_1$, $\bar{f}_1$, $f_2$, $\bar{f}_2$, $f_3$, $\bar{f}_3$, $f_4$, $\bar{f}_4$, $f_5$, $\bar{f}_5$, — $f_{n-1}$, $\bar{f}_{n-1}$, $f_n$, $\bar{f}_n$, respectively as shown in the figure, and wherein $f_1$ and $\bar{f}_1$, $f_2$ and $\bar{f}_2$ —, $f_n$ and $\bar{f}_n$ have opposite signal levels to each other, e.g., they are logically complementary so that when $f_1$ is of high level, $\bar{f}_1$ is of low level, and when $f_1$ is of low level, $\bar{f}_1$ is of high level (hereinafter, the high level is designated by "1" and the low level by "0"). Further, to the flip-flop circuit of the 1st counting stage or step is connected an input terminal I, and this input terminal I, is also connected to the switch $S_4$ in FIG. 1.

Now, the action is described. As explained in conjunction with FIG. 1, when the release button of the camera is pushed down a reset signal is given by the switch $S_7$. Then the level of the output terminals $f_1$, $f_2$, $f_3$, $f_4$, $f_5$, —, $f_{n-1}$, $f_n$ of each counting step becomes "0", whereas the level of $\bar{f}_1$, $\bar{f}_2$, $\bar{f}_3$, $\bar{f}_4$, $\bar{f}_5$, —, $\bar{f}_{n-1}$, $\bar{f}_n$ becomes "1." When the standard pulses are applied to the input terminal, for example, in numbers of pulses of 2, 4, 8, 16, 32 —, $2^{n-2}$, $2^{n-1}$, the level of the output terminals $f_2$, $f_3$, $f_4$, $f_5$, —, $f_{n-1}$, $f_n$ of each counting step becomes "1" in succession.

Figure 3:
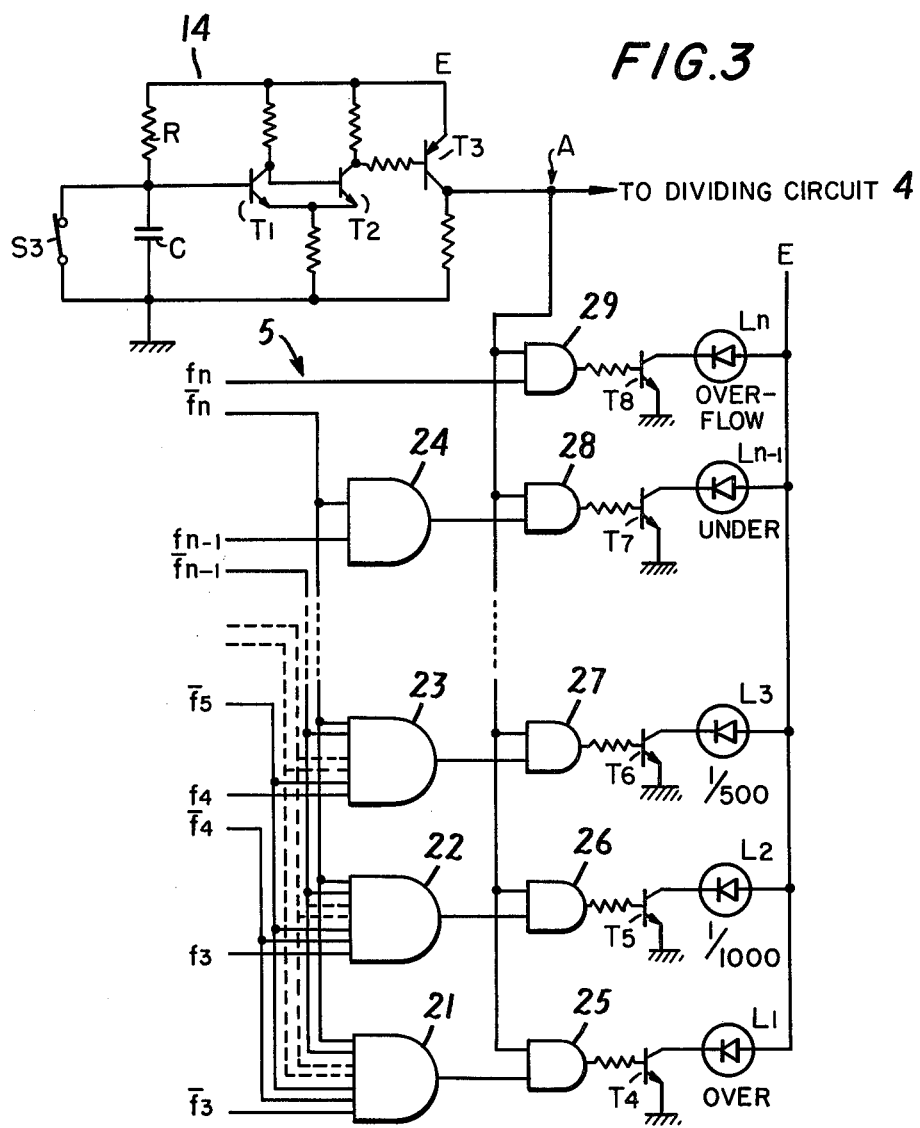
FIG. 3 is a schematic circuit diagram of the display circuit and delay circuit shown in FIG. 1.

FIG. 3 shows an example of the display circuit 5 and the delay circuit 14. In the display circuit 5, the input terminals of AND circuits 21, 22, 23, 24 are connected to the output terminals $f_3$, $\bar{f}_3$, $f_4$, $\bar{f}_4$, $f_5$, $\bar{f}_5$, —, $f_{n-1}$, $\bar{f}_{n-1}$, $\bar{f}_n$ of each counting step described in FIG. 2, and the output of each of the AND circuits 21, 22, 23, 24 are inputs to AND circuits 25, 26, 27, 28, and the input terminal of an AND circuit 29 is connected to the output terminal $f_n$ of the last flip-flop circuit $F_n$ of the reversible counting circuit 6. The outputs of the AND circuits 25, 26, 27, 28, 29 are connected to the respective bases of transistors $T_4$, $T_5$, $T_6$, $T_7$, $T_8$, and further to the collectors thereof are connected display elements $L_1$, $L_2$, $L_3$, —, $L_{n-1}$, $L_n$ consisting of light emitting diodes. And when $L_1$ is lighted an indication "OVER" showing over-exposure is given, when $L_2$ is lighted an indicated "1/1000S" is given, when $L_3$ is lighted an indication "1/500S" is given, when $L_{n-1}$ is lighted an indication "UNDER" showing by hand vibration is given, and when $L_n$ is lighted an indication "OVER-FLOW" is given.

The other input terminals of the AND circuits 25, 26, 27, 28, 29 are connected to the collector of an output transistor $T_3$ of the delay circuit 14. The delay circuit 14 is comprised of a Schmidt circuit 14 consisting of transistors $T_1$, $T_2$, wherein the collector of the transistor $T_2$ is connected to the output transistor $T_3$, to the base of the transistor $T_1$ is connected a series circuit consisting of a resistance R and a condenser C as shown in the figure, and on both ends of the condenser C is connected the timing switch $S_3$ as explained in conjunction with FIG. 1.

Now the action is described. When the reversible counting circuit 6 is reset by pushing down the release button, all of $f_3$, $f_4$, $f_5$, — $f_{n-1}$, $f_n$ become "1" and all of $\bar{f}_3$, $\bar{f}_4$, $\bar{f}_5$, — $\bar{f}_{n-1}$, $\bar{f}_n$ become "0" so that the output of the AND circuit 21 becomes "1", and the outputs of the AND circuits 22, 23, 24 become "0". On the other hand, as the timing switch $S_3$ is still closed, the transistors $T_2$, $T_3$ are in a conductive state, and the collector point A of the transistor $T_3$ becomes "1," and since the signal for this "1" is an input to the AND circuits 25, 26, 27, 28, 29, only the output of the AND circuit 25 becomes "1", making the transistor $T_4$ become conductive. Therefore $L_1$ is lighted to indicate "OVER;" whereas the other display elements $L_2$, $L_3$, —, $L_{n-1}$, $L_n$ are not lighted. Suppose that four pulses are input to the reversible counting circuit 6, and thereby an exposure time is obtained at 1/1000 sec. Then the level of $f_3$ becomes "1" and that of $\bar{f}_3$ becomes "0." Therefore, the output of the AND circuit 22 becomes "1" and the output of the AND circuit 26 becomes also "1," making the transit or $T_5$ become conductive, and $L_2$ is lighted to indicate "1/1000S." In this case, as a "0" signal is applied to the input terminal of the AND circuit 21 by $\bar{f}_3$, $L_1$ is extinguished. And, when light pulse are applied to the reversible counting circuit 6, the level of $f_4$ becomes "1" and that of $\bar{f}_4$ becomes "0," so that only the outputs of the AND circuits 23 and 27 become "1," causing the transistor $T_6$ to be conductive, and lighting $L_3$ to indicate "1/500S."

In a similar manner, thereafter, input of $2^{n-2}$ pulses in the reversible counting circuit 6 light $L_{n-1}$ to indicate a warning "UNDER" of hand vibration. Also, when $2^{n-1}$ pulses are input, $L_n$ is lighted to indicate "OVERFLOW" and that the exposure limit has been exceeded.

In this way, by lighting one of the display elements $L_1$, $L_2$, $L_3$, —, $L_{n-1}$, $L_n$ according to the memory value stored in the reversible counting circuit 6, the shutter speed or other various warnings are indicated digitally to the photographer.

After the number of pulses corresponding to the brightness of the photographed body is counted in the reversible counting circuit 6, the shutter begins to open, and thereby the timing switch $S_3$ is opened by the shutter opening member.

By the opening of the timing switch $S_3$, a charging current flows into the condenser C through the resistance R, and when the charging voltage of the condenser C reaches a certain predetermined value the transistor $T_1$ becomes conductive, and therefore, the transistors $T_2$, $T_3$ become non-conductive. Accordingly since the level of point A of the collector of the transistor $T_3$ becomes "0," and a trigger pulse reversed from "1" to "0" produced at this point A is an input to the AND circuits 25, 25, 27, 28, 29 so that all outputs of the AND circuits become "0." Therefore, the display elements $L_1$, $L_2$, $L_3$, —, $L_{n-1}$, $L_n$ are all extinguished.

On the other hand, the trigger pulse produced at the point A of the collector of the transistor $T_3$ is led to the frequency dividing circuit 4 as explained in conjunction with FIG. 1 to enable the frequency dividing circuit 4, and then a subtraction of the memory value stored in the reversible counting circuit 6 is started.

Further, the trigger pulse is produced for calling-out the memory contents of the counting circuit in the above case after the timing switch $S_3$ is opened and the trigger pulse delayed for a certain definite time by the delayed circuit 14. This is for the purpose of synchronizing the shutter opening time and the calling-out time of the memory value, but the trigger pulse may be produced immediately after opening of the timing switch $S_3$.

In addition, in the above embodiment of this invention, a reversible counting circuit is used as the counting circuit, but it is clear that this invention is applicable to a digital memory regenerative electric shutter circuit of such a type that the number of pulses varying according to the brightness of the photographed body is counted in a first counting circuit, the pulses coming from the pulse generator synchronously with starting of the shutter opening are counted in a second counting circuit, and a shutter closing signal is produced when the counting value of the first and the second counting circuits are brought into coincidence.

As described above, according to this invention, a trigger pulse is produced by the action of a timing switch that opens synchronously with starting of the shutter opening. A display circuit for indicating the shutter speed in accord with a memory value stored in a counting circuit, receives the trigger pulse and the display circuit is reset by this trigger pulse, so that the battery drain is reduced.

We claim:

1. A shutter control circuit of the type having means for developing a plurality of pulses the number of which is representative of an exposure time; means for counting and storing said plurality of pulses and for reading-out the number of stored pulses in response to command signals, for controlling an exposure time; and means for applying a command signal to said means for counting and for reading-out to initiate reading-out of the stored pulses; wherein the improvement comprises: a display circuit, cooperative with said means for counting and storing, for visually displaying the exposure time represented by the number of pulses counted and stored; said display circuit comprising means, responsive to the command signal for initiating reading-out of the stored pulses, for disabling said display circuit thereby to reduce power consumption by said display circuit during exposure.

2. A shutter control circuit according to claim 1, wherein said display circuit is comprised of: a plurality of logic gates cooperative with said means for counting and storing to develop a plurality of output signals each representative of a different exposure time; a plurality of AND gates each receptive of and enabled by a respective one of the logic gate output signals representative of exposure time, and each receptive of and disabled by the command signal; and a plurality of display elements each energized by a respective one of said AND gates; whereby generation of one of the plurality of logic gate output signals is effective to enable a respective display element to display the exposure time represented by the logic gate output signal, and whereby generation of the command signal is effective to de-energize all of the display elements.

* * * * *